US007621573B2

(12) United States Patent
Thomas et al.

(10) Patent No.: US 7,621,573 B2
(45) Date of Patent: Nov. 24, 2009

(54) FLUSH VEHICLE DOOR HANDLE

(75) Inventors: Bob Thomas, Oak Park, CA (US); Jack E. Brown, Rochester Hills, MI (US); Timothy V. McGrath, Davison, MI (US); Christopher J. Twarog, Ferndale, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 285 days.

(21) Appl. No.: 11/835,704

(22) Filed: Aug. 8, 2007

(65) Prior Publication Data

US 2009/0039671 A1 Feb. 12, 2009

(51) Int. Cl.
*B62D 39/00* (2006.01)

(52) U.S. Cl. ...................... 296/1.02; 49/501; 292/336.3

(58) Field of Classification Search .................. 49/501; 292/336.3, 347, 348; 296/146.1, 1.02
See application file for complete search history.

(56) References Cited

U.S. PATENT DOCUMENTS

| | | | | |
|---|---|---|---|---|
| 6,719,336 | B2 * | 4/2004 | Sato | 292/336.3 |
| 2005/0057050 | A1 * | 3/2005 | Saitoh et al. | 292/336.3 |

* cited by examiner

*Primary Examiner*—Lori L Lyjak

(57) ABSTRACT

A handle assembly for a vehicle door and a method of operating the handle assembly is disclosed. The door handle assembly may include a pivot bracket mounted in the vehicle door, a handle arm pivotally mounted to the pivot bracket, a handle alignable flush with a door handle cutout, and a motor assembly operatively engaging the handle arm to selectively cause pivoting of the handle arm relative to the pivot bracket. The door handle assembly may also include a handle depression limit switch, a handle flush button, or a handle extension limit switch in communication with a control module that controls the motor.

20 Claims, 8 Drawing Sheets

FLUSH VEHICLE DOOR HANDLE

BACKGROUND OF INVENTION

The present invention relates generally to door handles for automotive vehicles, and in particular to door handles that automatically extend out for use and retract flush to the vehicle when not in use.

For some automotive vehicles, door handles needed for opening the vehicle doors sometimes detract from the overall aesthetic appearance of the vehicle. This is particularly true for door handles that extend outboard of the outer surface of the door.

Some have attempted to overcome this by employing a door handle that is partially flush with the outboard surface of the door. That is, the top portion of the handle is actually flush with the outside surface of the door, while the outer door panel adjacent to the bottom portion is recessed inboard (or a handle bezel is recessed inboard) enough to allow ones fingers to slide up behind the door handle. So, in reality, these types of door handles are not really flush with the door all of the way around the periphery of the handle. Consequently, the aesthetic appeal achieved with a door handle that is truly flush all of the way around is not achieved.

Thus a desire has arisen for a way to provide for a fully flush door handle on a vehicle, while still allowing one to use the handle to open the vehicle door.

SUMMARY OF INVENTION

An embodiment contemplates a door handle assembly for a vehicle door having an outer door panel with a door outboard surface and a door handle cutout. The door handle assembly may comprise a pivot bracket, mountable in the vehicle door, and having a pivot pin mounting flange; a handle arm pivotally mounted to the pivot bracket pivot pin mounting flange at a first location and having a handle support at a second location spaced from the first location; a handle, mounted on the handle support, and including a handle outboard surface with a periphery alignable with the door handle cutout; and a motor assembly, including a motor, mounted in fixed relation to the pivot bracket, and operatively engaging the handle arm to selectively cause pivoting of the handle arm relative to the pivot bracket.

An embodiment contemplates a vehicle door comprising an outer door panel having an outboard surface and a door handle cutout, and a door handle assembly. The door handle assembly may include a handle arm mounted inside the vehicle door adjacent to the outer door panel and pivotable relative to the outer door panel, with the handle arm having a handle support; a handle, mounted on the handle support, and including a handle outboard surface with a periphery selectively extendable through the door handle cutout, with the handle outboard surface selectively alignable flush with the outboard surface of the outer door panel; a motor assembly, including a motor mounted in fixed relation relative to the outer door panel, and operatively engaging the handle arm to selectively cause pivoting of the handle arm relative to the outer door panel; and a control module operatively engaging the motor assembly to selectively rotate the motor in a first rotational direction and an opposite second rotational direction, whereby rotation of the motor in the first rotational direction results in the handle outboard surface extending outboard of the outboard surface of the outer door panel and rotation of the motor in the second rotational direction allows the handle outboard surface to be made flush with the outboard surface of the outer door panel.

An embodiment contemplates a method of operating a door handle assembly mounted in a vehicle door having an outer door panel with a door outboard surface, the method comprising the steps of: detecting a handle extension request for a handle of the door handle assembly; actuating a motor assembly to pivot an outboard surface of the handle outboard of the door outboard surface if the handle extension request is detected; unlatching a door e-latch mounted on the vehicle door; detecting if the door e-latch becomes latched; and actuating the motor assembly to pivot the outboard surface of the handle to a position flush with the door outboard surface if the latching of the door e-latch is detected.

An advantage of an embodiment is an improved aesthetic appearance for a door and door handle on a vehicle, while still enabling a fully functional vehicle door handle.

An advantage of an embodiment is that the improved aesthetic appearance is achieved while avoiding clearance concerns between the door handle assembly and a movable window in the door.

DETAILED DESCRIPTION

Figure 1:
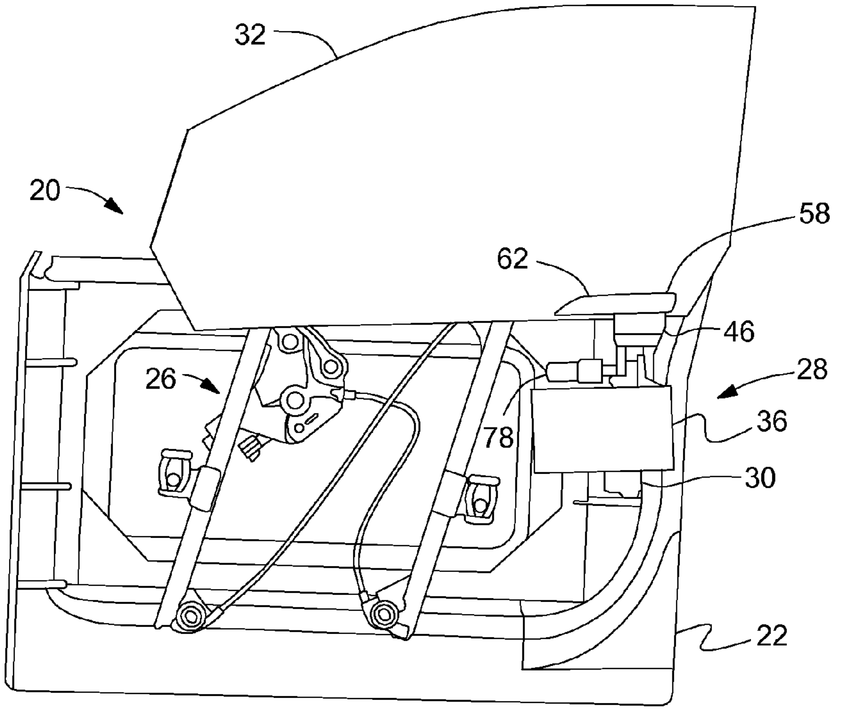
FIG. 1 is a side view looking inboard at a portion of a vehicle door.
Figure 2:
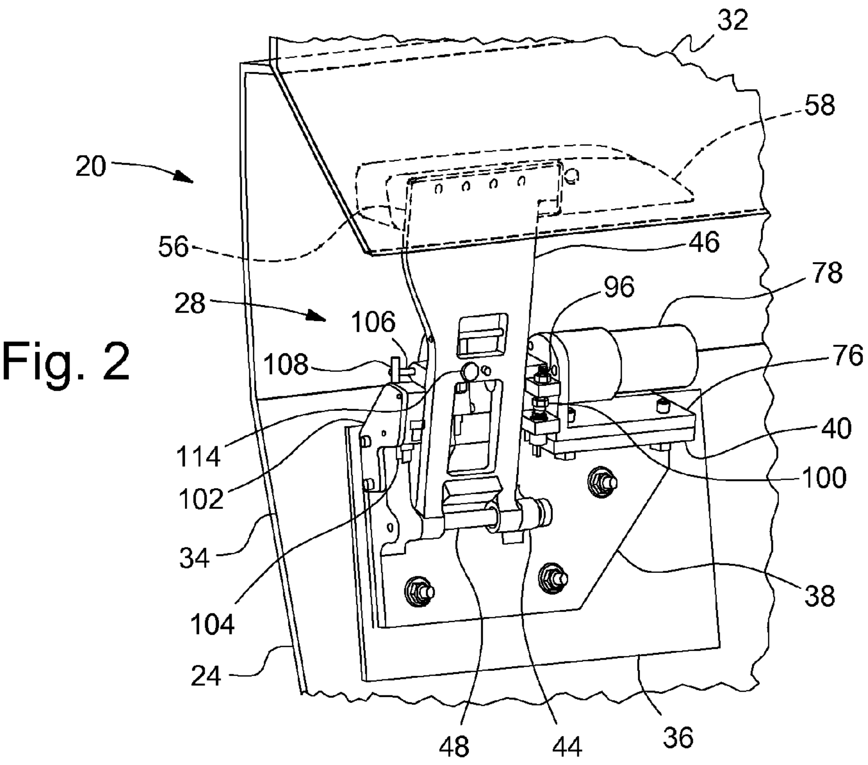
FIG. 2 is a perspective view of a portion of a vehicle door, looking outboard and down.
Figure 3:
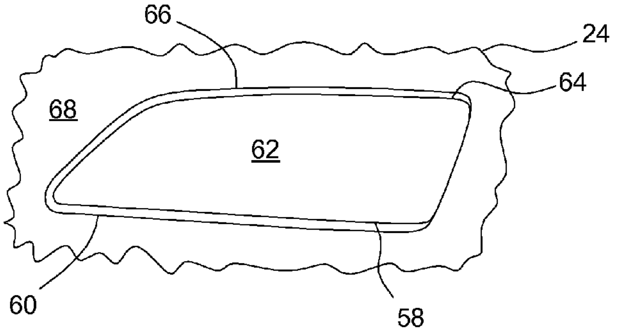
FIG. 3 is a perspective view of a door handle in a flush position relative to an outboard surface of a vehicle door.
Figure 4:
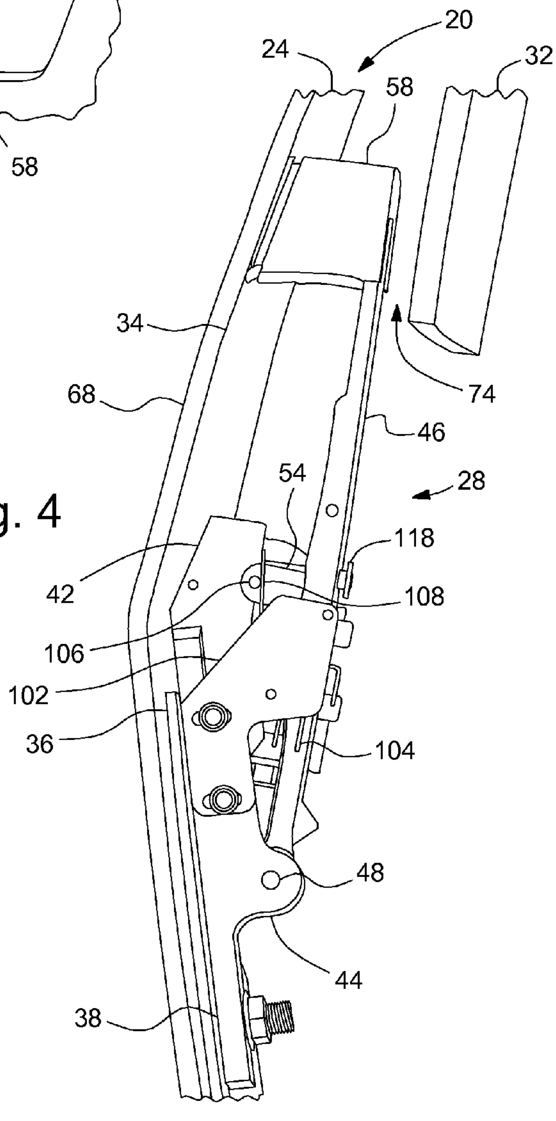
FIG. 4 is a side view, looking forward, of a portion of a vehicle door, with a door handle in a flush position relative to an outboard surface of the vehicle door.
Figure 5:
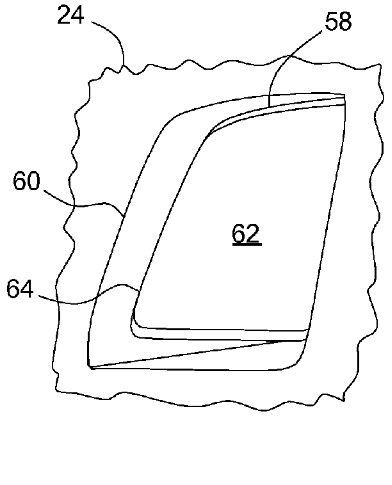
FIG. 5 is a perspective view of a door handle in a depressed position relative to an outboard surface of a vehicle door.
Figure 6:
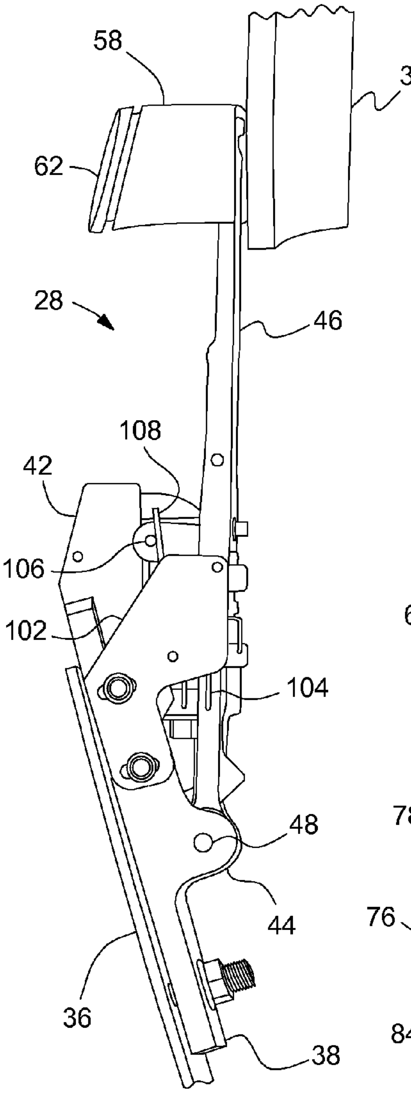
FIG. 6 is a side view, looking forward, of a portion of a vehicle door, with a door handle in a depressed position relative to an outboard surface of the vehicle door.
Figure 7:
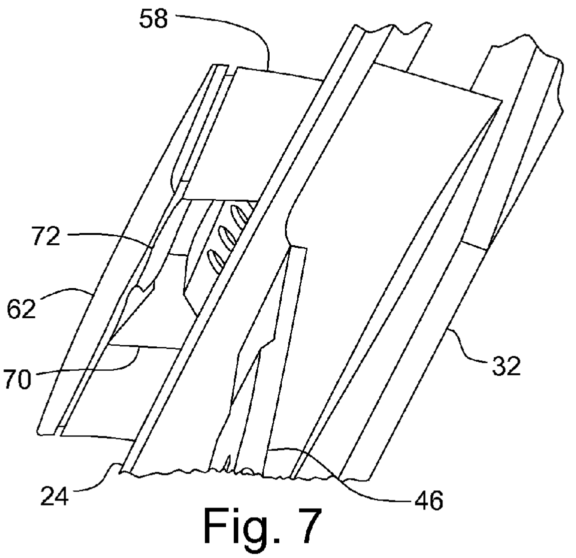
FIG. 7 is a perspective view of a portion of a vehicle door, looking upward and forward, with a door handle in an extended position relative to an outboard surface of the vehicle door.
Figure 8:
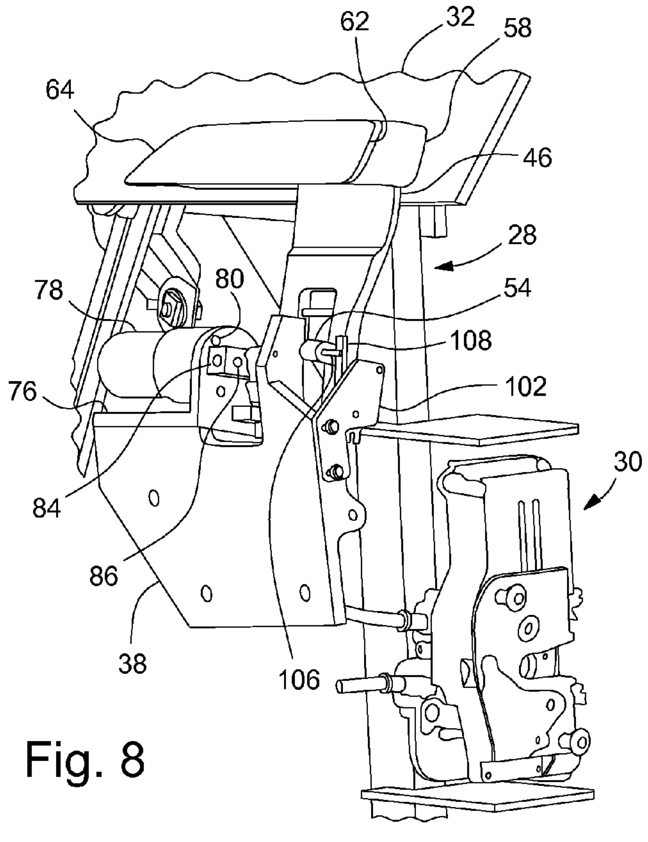
FIG. 8 is a perspective view of a portion of a vehicle door, looking inboard and forward.
Figure 9:
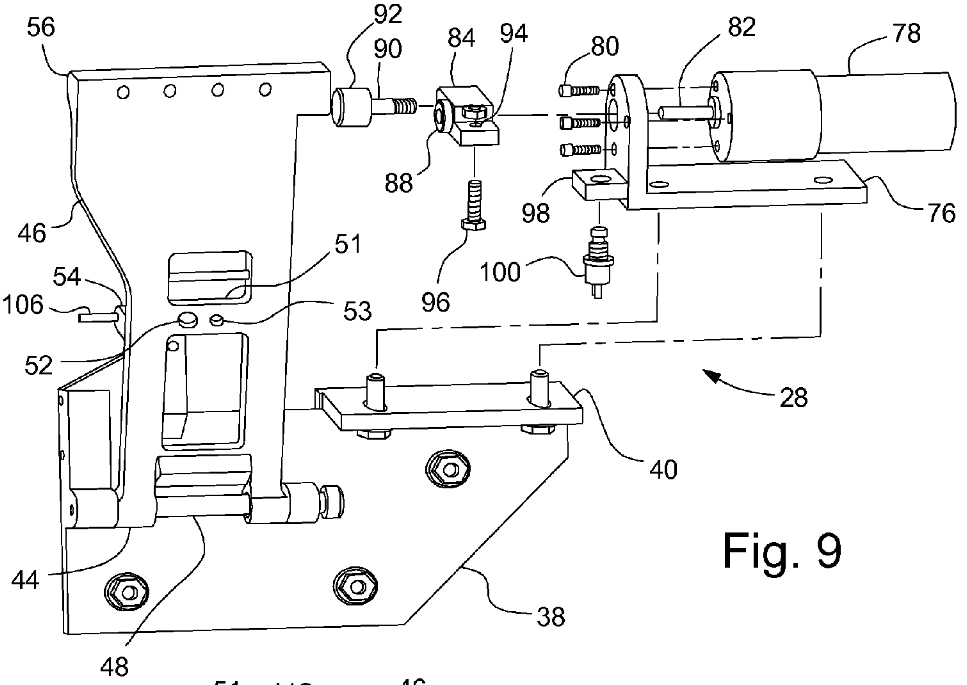
FIG. 9 is a partially exploded view, looking outboard at a portion of a door handle assembly.
Figure 10:
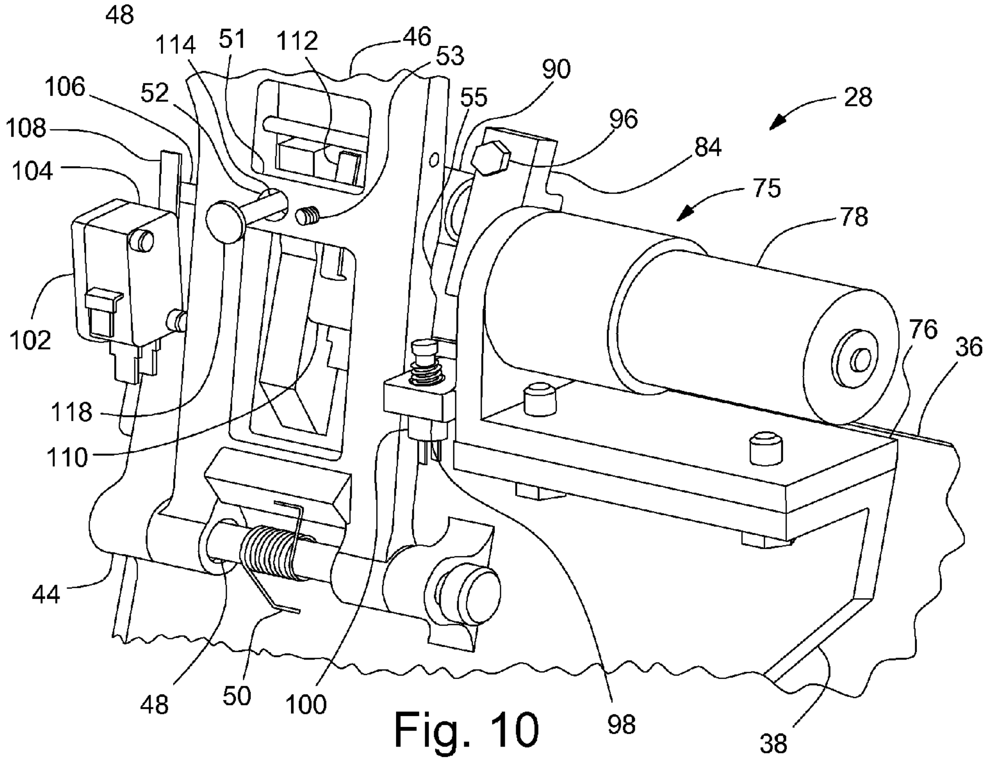
FIG. 10 is a perspective view, looking outboard and down, of a portion of a door handle assembly.
Figure 11:
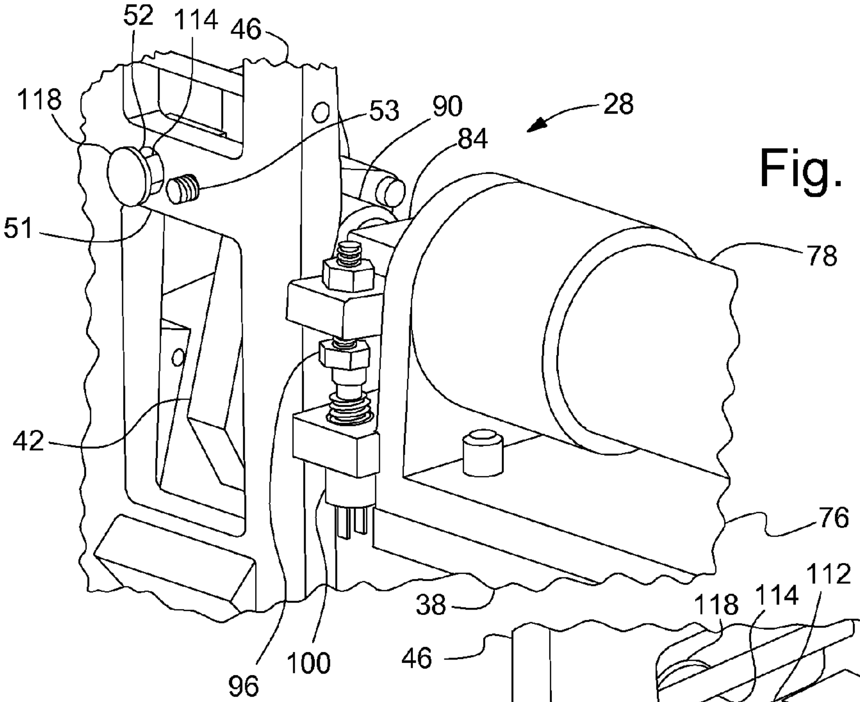
FIG. 11 is a perspective view, looking outboard and aft, of a portion of a door handle assembly.
Figure 12:
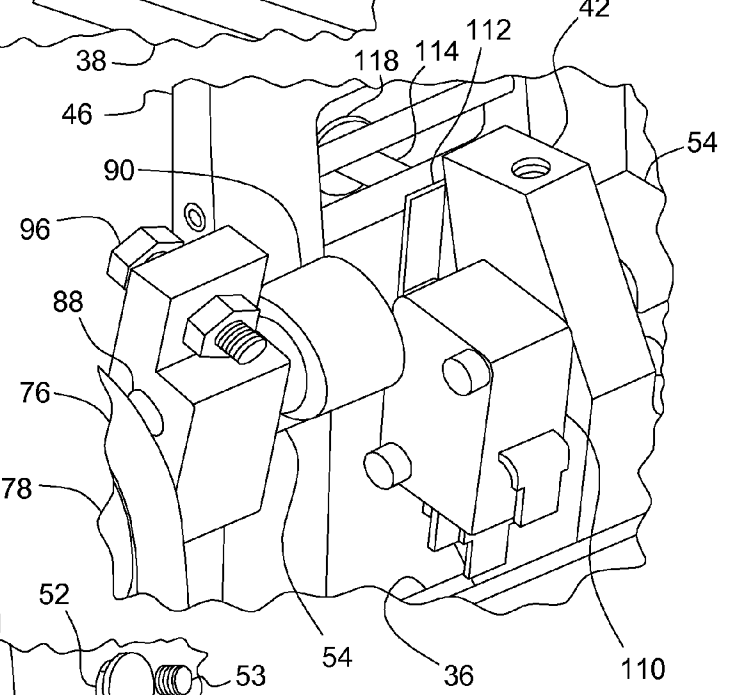
FIG. 12 is another perspective view of a portion of a door handle assembly.
Figure 13:
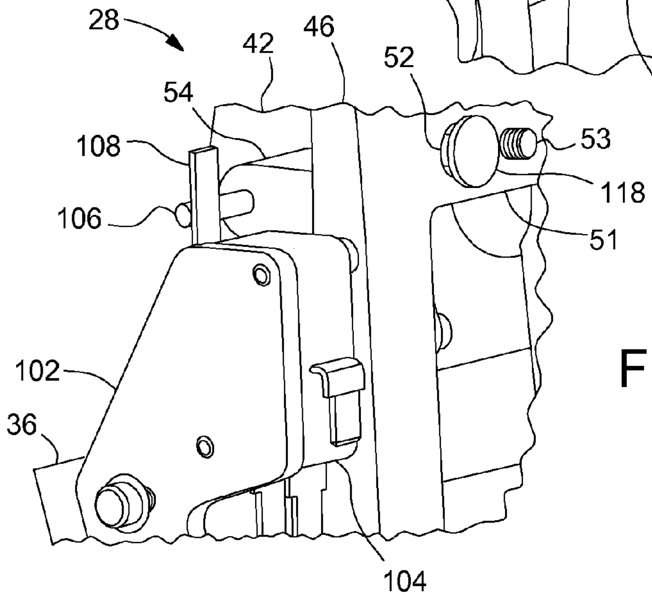
FIG. 13 is another perspective view of a portion of a door handle assembly.
Figure 14:
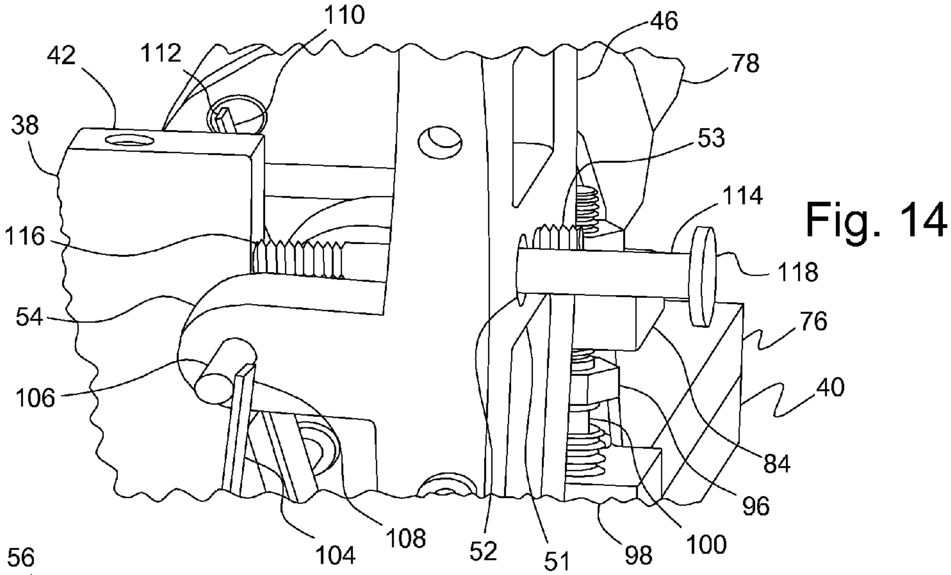
FIG. 14 is another perspective view of a portion of a door handle assembly.
Figure 15:
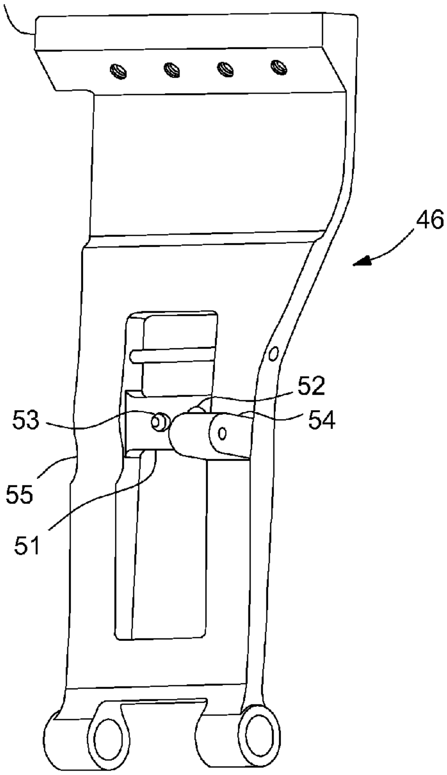
FIG. 15 is a perspective view of a handle arm of a door handle assembly.
Figure 16:
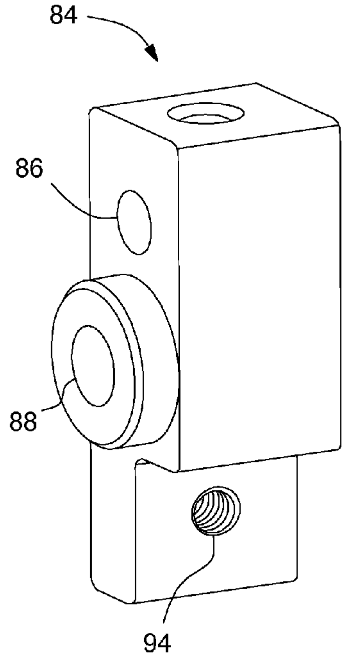
FIG. 16 is a perspective view of an eccentric motor pivot of a door handle assembly.

Referring to FIGS. 1-16, different portions of a vehicle door, indicated generally at 20, is shown. The door 20 includes an inner door panel 22 and an outer door panel 24. Between the inner and outer panels 22, 24 a window regulator assembly 26, a door handle assembly 28, a door e-latch 30, and a movable window 32 are mounted. The movable window 32 mounts to the window regulator assembly 26 and slides into and out of the door 20. The door e-latch 30 is an electronically controlled latching assembly that engages and disengages a striker (not shown) to hold the door closed and release the door to allow it to be pulled open.

The door handle assembly 28 mounts to an inboard surface 34 of the outer door panel 24 via a mounting plate 36. The door handle assembly includes a pivot bracket 38 mounted to the mounting plate 36. The pivot bracket 38 includes a motor mount flange 40, a positive stop mounting flange 42, and a pair of pivot pin mounting flanges 44.

A handle arm 46 pivotally mounts to the pivot pin mounting flanges 44 via a pivot pin 48. A torsion spring 50 (only shown in FIG. 10) mounts on the pivot pin 48 and engages the handle arm 46 and pivot bracket 38 such that the upper portion of the handle arm 46 is biased outboard. The handle arm 46 has a cross member 51, which includes a positive stop hole 52 adjacent to an extension limit switch pin 53. The handle arm also includes a limit switch pin support 54 adjacent to the positive stop hole 52, a cam surface 55 adjacent to the extension limit switch pin 53, and a handle support 56 on an upper end opposite to the pivot pin 48.

A door handle 58 mounts on the handle support 56. The door handle 58 extends into a door handle cutout 60 in the outer door panel 24 and includes an outboard surface 62 having a periphery 64. The shape of the periphery 64 preferably matches the shape of the door handle cutout 60, with a small gap 66 of, for example, two millimeters between the two. The outboard surface 62, when in a door handle flush position (see FIG. 3), is flush with the adjacent outboard surface 68 of the outer door panel 24. The door handle 58 also includes a handle finger recess 70 accessible from the underside of the handle 58 when the door handle 58 is in a handle extended position (see FIG. 7). Within the finger recess 70 is mounted a door latch release switch 72 that is accessible by sliding ones fingers into the finger recess 70.

One will note that the handle arm 46 can be relatively long, allowing for significant distance between the pivot pin 48 and the handle support 56. By allowing the pivot pin 48, and hence the handle pivot axis, to be much lower in the door than the handle support 56, the door handle 58 can appear to pop straight out of the outer door panel 24 even though it is actually pivoting about the lower pivot location. Moreover, the low pivot location, being significantly lower in the door 20 than the handle 58 generally allows more room for packaging many of the components of the door handle assembly 28 without interfering with the movable window. An acceptable gap 74 between the handle 58 and handle arm 46 is maintained when the handle 58 is pushed to its door handle depressed position (see FIGS. 5 and 6). The gap 741 then, is even larger when the door handle 58 is in its handle flush position (see FIGS. 3 and 4).

The door handle assembly 28 includes a motor assembly 75. A motor bracket 76 mounts to the motor mount flange 40 of the pivot bracket 38. A reversible motor 78 is mounted to the motor bracket 76, with motor mounting bolts 80, and has a motor shaft 82 extending through the motor bracket 76. An eccentric motor pivot 84 mounts on the motor shaft 82. The eccentric motor pivot 84 includes a motor shaft bore 86, within which the motor shaft 82 is secured, and a parallel but axially spaced roller bore 88. A roller 90 mounts in the roller bore 88 and has a cylindrical portion 92 that engages the cam surface 55 of the handle arm 46. The surface contact of the roller 90 against the handle arm 46 maintains the position of the handle arm 46 against the bias of the torsion spring 50. The eccentric motor pivot 84 also includes a threaded hole 94 within which a stop adjustment bolt 96 is mounted. The stop adjustment bolt 96 is axially adjustable in the hole 94 and is oriented to align with a handle flush button 100, which is mounted on a flange 98 extending from the motor bracket 76.

A limit switch bracket 102 mounts to the pivot bracket 38 and supports a handle depression limit switch 104 adjacent to the switch pin support 54 on the handle arm 46. A pin 106 extends from the switch pin support 54 in contact with a lever arm 108 extending from the handle depression limit switch 104. A handle extension limit switch 110 mounts to the positive stop mounting flange 42 of the pivot bracket 38 and includes a lever arm 112 extending therefrom engaging the extension limit switch pin 53.

A positive stop pin 114 is threaded into a hole 116 in the positive stop mounting flange 42 of the pivot bracket 38 and extends through the positive stop hole 52 in the handle arm 46. A head 118 on the positive stop pin 114 has a diameter that is larger than the positive stop hole 52. The positive stop pin 114 is threaded into the hole 116 a sufficient distance so that the head 118 will contact the cross member 51 (preventing any more inboard pivoting of the handle arm 46 and door handle 58) before the handle arm 46 or door handle 58 can contact the movable window 32.

Figure 17:
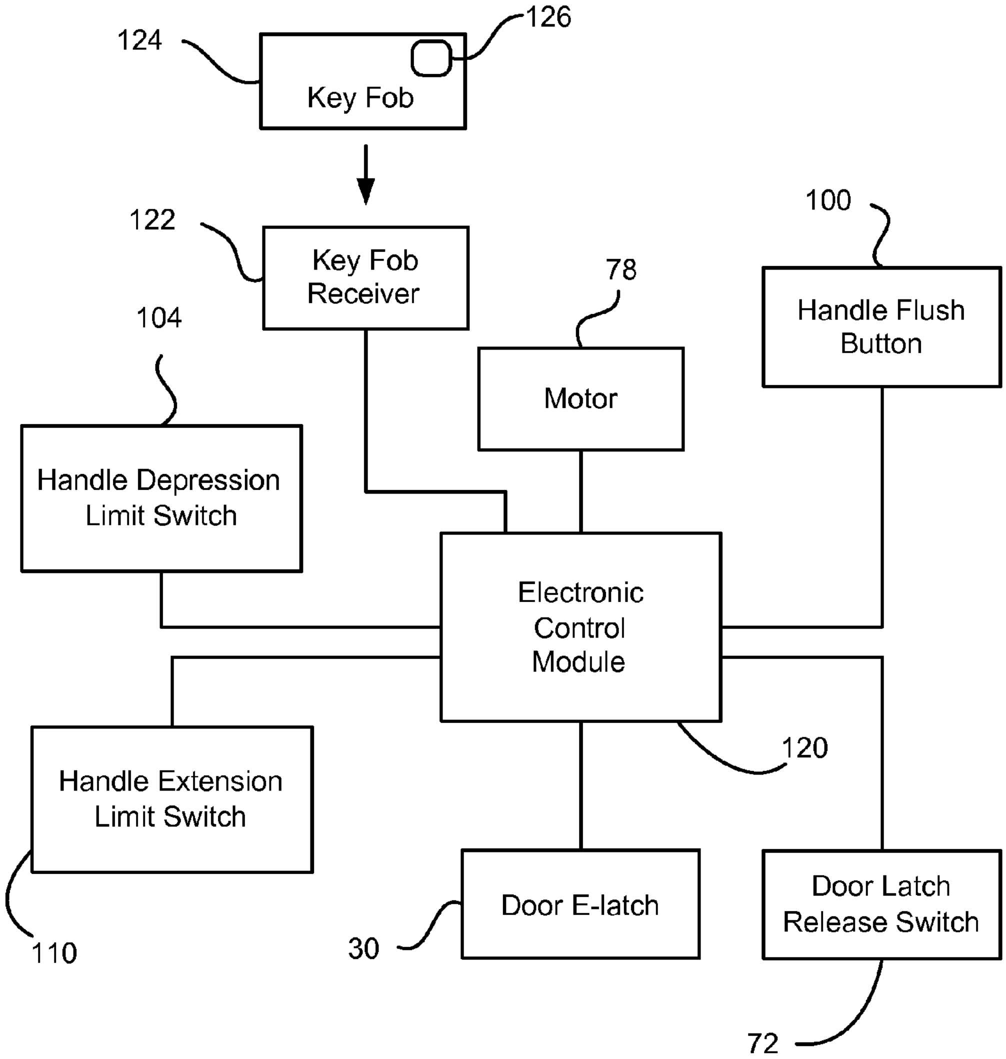
FIG. 17 is a block diagram of door components in communication with an electronic control module.

FIG. 17 is a block diagram of some of the door components that are in communication with an electronic control module 120. The motor 78 is controlled and can be driven in either direction by the control module 120. The handle flush button 100, handle depression limit switch 104, handle extension limit switch 110, and door latch release switch 72 each communicate with the control module 120 when actuated. Also, the control module 120 controls the opening and closing of the door latch on the door e-latch 30.

An optional key fob portion of the system is also shown in FIG. 17. A key fob receiver 122 is in communication with the control module 120 and receives wireless signals from a key fob 124. It is configured so that a push of a certain button 126 (for example a door unlock button) on the key fob 124 will transmit a signal to the key fob receiver 122 that requests a door handle extension. This configuration, then, provides an additional way to request a handle extension (other than pushing on the door handle until the handle depression limit switch is actuated).

Figure 18:
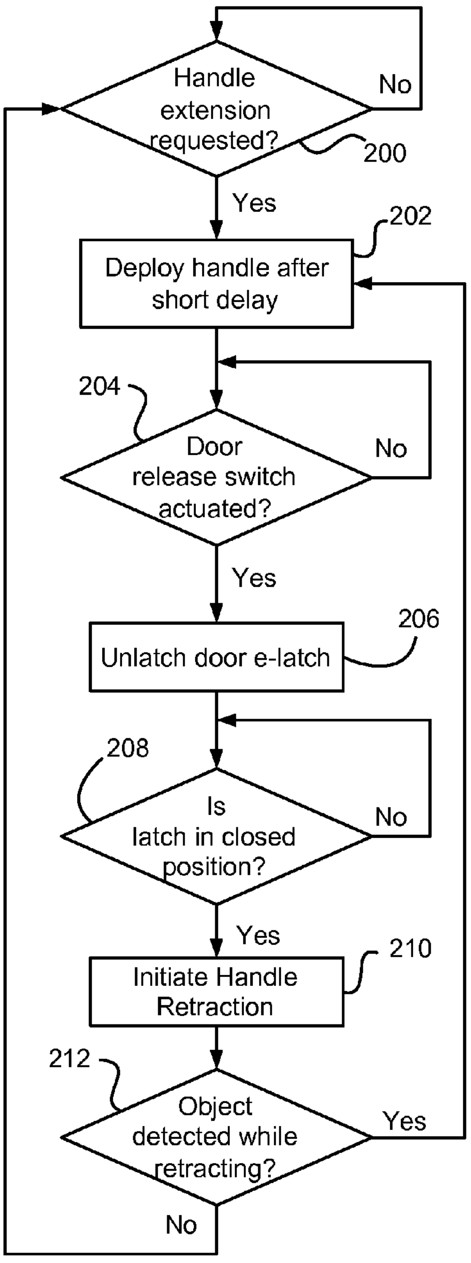
FIG. 18 is a flow chart illustrating the door handle process for opening and closing the door.

The operation of the vehicle door 20, with reference to FIG. 18 in view of FIGS. 1-17), will now be described. Initially, the outboard surface 62 of the door handle 58, around its entire periphery 64, is flush with the outboard surface 62 of the outer door panel 24, and the door 20 is closed. The control module 120 monitors the handle depression limit switch 104 and key fob receiver 122 (if the particular vehicle is so equipped) to determine it a handle extension is requested, block 200. If not, then monitoring continues, but if it is requested (as indicated by the handle depression limit switch 104 or key fob button 126 being actuated), the door handle 58 is deployed, preferably after a short delay, block 202.

The handle 58 is deployed by the controller 120 actuating the motor 78, which pivots the eccentric motor pivot 84. The pivoting of the eccentric motor pivot 84 causes the roller 90, which is offset from the axis of rotation of the motor shaft 82, to run along the cam surface 55. This allows the torsion spring 50 to pivot the handle arm 46, and hence move the door handle

58 outboard. As the door handle 58 approaches its handle extended position, the extension limit switch pin 53 moves outboard with the pivoting handle arm 46 and actuates the handle extension limit switch 110, at which point the controller 120 stops the motor 78. The door handle 58 is now fully deployed.

The controller 120 now determines if the door latch release switch 72 is actuated, block 204. This switch 72 can be actuated by one sliding fingers into the handle finger recess 70 and engaging the switch 72. If not actuated, then monitoring of the switch 72 continues, but if it is actuated, then the controller 120 causes the door e-latch 30 to unlatch, block 206. The specifics of how the door e-latch 30 unlatches the door will not be discussed in detail herein since electronic door latching and unlatching assemblies for use with automotive vehicles are known to those skilled in the art. With the door 20 unlatched, a user can now open the door 20.

Upon a user closing the vehicle door 20, the door e-latch 30 closes. If the e-latch 30 is in a closed position, block 208, then handle retraction is initiated, block 210. Handle retraction is accomplished by the controller 120 rotating the motor 78 in the opposite direction, causing the eccentric motor pivot 84 to push the roller 90 along the cam surface 55. This causes the roller 90 to pivot the handle arm 46, and hence the door handle 58, inboard against the bias of the torsion spring 50. If the release switch 72 is actuated while the door handle 58 is retracting, then the control module 120 will reverse the motor 78 to redeploy to the handle extended position, block 212. If not, then the handle 58 will continue retracting until it is in the handle flush position. The handle flush position is detected when the stop adjustment bolt 96 contacts the handle flush button 100, at which point the controller 120 stops the motor 78. The outboard surface 62 of the door handle 58 is now again flush with the outboard surface 68 of the outer door panel 24 around its entire periphery 64.

Figure 19:
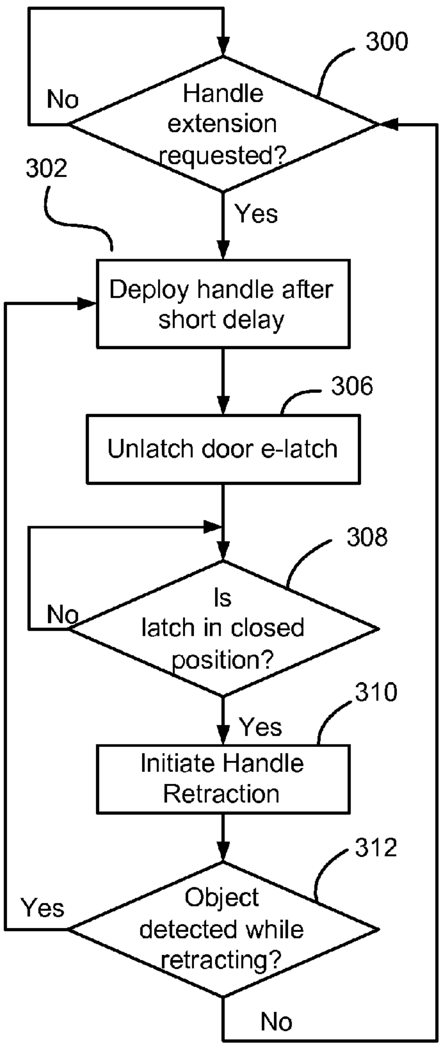
FIG. 19 is a flow chart similar to FIG. 17, but illustrating a second embodiment.

FIG. 19 illustrates a method according to a second embodiment, which is applicable to the assemblies illustrated in FIGS. 1-17. Initially, the outboard surface 62 of the door handle 58, around its entire periphery 64, is flush with the outboard surface 62 of the outer door panel 24, and the door 20 is closed. The control module 120 monitors the handle depression limit switch 104 (and key fob receiver 122, if so equipped) to determine if a handle extension is requested, block 300. If not, then monitoring continues, if it is requested, the door handle 58 is deployed, preferably after a short delay, block 302. The controller 120 automatically causes the door e-latch 30 to unlatch, block 306. With the door 20 unlatched, a user can now open the door 20.

Upon a user closing the vehicle door 20, the door e-latch 30 closes. If the e-latch 30 is in a closed position, block 308, then handle retraction is initiated, block 310. If the release switch 72 is actuated while the door handle 58 is retracting, then the control module 120 will reverse the motor 78 to redeploy to the handle extended position, block 312. If not, then the handle 58 will continue retracting until it is in the handle flush position.

As an alternative for the embodiment of FIG. 19, the door latch release switch 72 may be eliminated. In this case, step 312 accomplishes object detection by monitoring the time taken for handle retraction to the handle flush position. If the time the handle 58 is traveling inboard exceeds a predetermined amount of time and the handle 58 still has not reached the handle flush position, an obstruction is assumed and the controller 120 will automatically re-deploy the handle 58.

While certain embodiments of the present invention have been described in detail, those familiar with the art to which this invention relates will recognize various alternative designs and embodiments for practicing the invention as defined by the following claims.

What is claimed is:

1. A door handle assembly for a vehicle door having an outer door panel with a door outboard surface and a door handle cutout, the door handle assembly comprising:

a pivot bracket, mountable in the vehicle door, and having a pivot pin mounting flange;

a handle arm pivotally mounted to the pivot bracket pivot pin mounting flange at a first location and having a handle support at a second location spaced from the first location;

a handle, mounted on the handle support, and including a handle outboard surface with a periphery alignable with the door handle cutout; and a motor assembly, including a motor, mounted in fixed relation to the pivot bracket, and operatively engaging the handle arm to selectively cause pivoting of the handle arm relative to the pivot bracket.

2. The door handle assembly of claim 1 wherein the motor assembly includes a motor shaft extending from the motor, an eccentric motor pivot mounted on the motor shaft, and a roller mounted on the eccentric motor pivot in eccentric relation to the motor shaft, the roller being in surface contact with the handle arm.

3. The door handle assembly of claim 2 wherein the handle arm includes a cam surface and the roller is in surface contact with the cam surface.

4. The door handle assembly of claim 1 including a spring operatively engaging the handle arm to bias the handle support in an outboard direction.

5. The door handle assembly of claim 1 including a handle depression limit switch mounted in fixed relation to the pivot bracket and adjacent to the handle arm, the handle arm configured to actuate the handle depression limit switch when the handle support pivots a predetermined distance away from the pivot bracket.

6. The door handle assembly of claim 1 including a handle flush button mounted in fixed relation to the pivot bracket and adjacent to the motor assembly, the motor assembly configured to actuate the handle flush button when the handle support is at a predetermined angle relative to the pivot bracket.

7. The door handle assembly of claim 1 including a handle extension limit switch mounted in fixed relation to the pivot bracket and adjacent to the handle arm, the handle arm configured to actuate the handle extension limit switch when the handle support pivots a predetermined distance toward the pivot bracket.

8. The door handle assembly of claim 1 including a stop adjustment bolt mounted to the pivot bracket and slidably received through a positive stop hole in the pivot bracket, the stop adjustment bolt having a head configured to abut the positive stop hole to set a maximum pivoting of the handle support away from the pivot bracket.

9. The door handle assembly of claim 1 wherein the handle includes a handle finger recess and an electronic door latch release switch mounted in the handle finger recess.

10. A vehicle door comprising:

an outer door panel having an outboard surface and a door handle cutout;

a door handle assembly including a handle arm mounted inside the vehicle door adjacent to the outer door panel and pivotable relative to the outer door panel, the handle arm having a handle support; a handle, mounted on the handle support, and including a handle outboard surface with a periphery selectively extendable through the door handle cutout, the handle outboard surface selectively alignable flush with the outboard surface of the outer door panel; a motor assembly, including a motor mounted in fixed relation relative to the outer door panel, and operatively engaging the handle arm to selectively cause pivoting of the handle arm relative to the outer door panel; and a control module operatively engaging the motor assembly to selectively rotate the motor in a first rotational direction and an opposite second rotational direction, whereby rotation of the motor in the first rotational direction results in the handle outboard surface extending outboard of the outboard surface of the outer door panel and rotation of the motor in the second rotational direction allows the handle outboard surface to be made flush with the outboard surface of the outer door panel.

11. The vehicle door of claim 10 including a key fob receiver operatively connected to and controlled by the control module, and a key fob having a handle extension request button thereon.

12. The vehicle door of claim 10 wherein the motor assembly includes a motor shaft extending from the motor, an eccentric motor pivot mounted on the motor shaft, and a roller mounted on the eccentric motor pivot in eccentric relation to the motor shaft, the roller being in surface contact with the handle arm.

13. The vehicle door of claim 10 including a handle depression limit switch mounted in fixed relation to the outer door panel and adjacent to the handle arm, the handle arm configured to actuate the handle depression limit switch when the handle support pivots a predetermined distance inboard from the outer door panel.

14. The vehicle door of claim 10 including a handle flush button mounted in fixed relation to the outer door panel and adjacent to the motor assembly, the motor assembly configured to actuate the handle flush button when the handle outboard surface is flush with the outboard surface of the outer door panel.

15. The vehicle door of claim 10 including a handle extension limit switch mounted in fixed relation to the outer door panel and adjacent to the handle arm, the handle arm configured to actuate the handle extension limit switch when the handle outboard surface pivots a predetermined distance outboard of the outboard surface of the outer door panel.

16. The vehicle door of claim 10 wherein the handle includes a handle finger recess and an electronic door latch release switch mounted in the handle finger recess, the door latch release switch operatively engaging the control module.

17. A method of operating a door handle assembly mounted in a vehicle door having an outer door panel with a door outboard surface, the method comprising the steps of:

(a) detecting a handle extension request for a handle of the door handle assembly;

(b) actuating a motor assembly to pivot an outboard surface of the handle outboard of the door outboard surface if the handle extension request is detected;

(c) unlatching a door e-latch mounted on the vehicle door;

(d) detecting if the door e-latch becomes latched; and (e) actuating the motor assembly to pivot the outboard surface of the handle to a position flush with the door outboard surface if the latching of the door e-latch is detected.

18. The method of claim 17 wherein step (c) is further defined by detecting the actuation of a door release switch in the door handle assembly before unlatching the door e-latch.

19. The method of claim 17 wherein step (e) is further defined by reversing the motor assembly actuation and pivoting the outboard surface of the handle outboard of the door outboard surface if a door release switch is actuated while the motor assembly is pivoting the outboard surface of the handle toward the position flush with the door outboard surface.

20. The method of claim 17 wherein step (e) is further defined by reversing the motor assembly actuation and pivoting the outboard surface of the handle outboard of the door outboard surface if a predetermined time period is exceeded while the motor assembly is pivoting the outboard surface of the handle toward the position flush with the door outboard surface.

* * * * *